US009243920B2

(12) United States Patent
Ettinger et al.

(10) Patent No.: US 9,243,920 B2
(45) Date of Patent: Jan. 26, 2016

(54) SYSTEM AND METHOD FOR ADAPTING THE ROUTING INFORMATION PROVIDED BY A MAPPING OR ROUTING DEVICE

(71) Applicants: Esther Abramovich Ettinger, Laguna Beach, CA (US); Gil Emanuel Fuchs, Nes Tziona (IL)

(72) Inventors: Esther Abramovich Ettinger, Laguna Beach, CA (US); Gil Emanuel Fuchs, Nes Tziona (IL)

( * ) Notice: Subject to any disclaimer, the term of this patent is extended or adjusted under 35 U.S.C. 154(b) by 0 days.

(21) Appl. No.: 14/054,320

(22) Filed: Oct. 15, 2013

(65) Prior Publication Data

US 2014/0114573 A1    Apr. 24, 2014

Related U.S. Application Data

(60) Provisional application No. 61/716,321, filed on Oct. 19, 2012.

(51) Int. Cl.
| G01C 21/00 | (2006.01) |
| G01C 21/34 | (2006.01) |
| G01C 21/36 | (2006.01) |

(52) U.S. Cl.
CPC ............ *G01C 21/34* (2013.01); *G01C 21/3641* (2013.01)

(58) Field of Classification Search
CPC ........... G01C 21/3492; G01C 21/3626; G06Q 30/00; G06F 17/30991
USPC ......... 701/400, 409, 410, 420, 421, 437, 438, 701/533, 538, 540
See application file for complete search history.

(56) References Cited

U.S. PATENT DOCUMENTS

| 4,974,170 | A  | 11/1990 | Boure et al. |
| 5,470,233 | A  | 11/1995 | Fuchterman et al. |
| 5,682,525 | A  | 10/1997 | Bouve et al. |
| 5,784,059 | A  | 7/1998  | Morimoto et al. |
| 6,115,669 | A  | 9/2000  | Watanabe et al. |
| 6,339,746 | B1 | 1/2002  | Sugiyama et al. |
| 6,427,118 | B1 | 7/2002  | Suzuki |
| 6,510,379 | B1 | 1/2003  | Hasegawa et al. |
| 6,728,635 | B2 | 4/2004  | Hamda et al. |

(Continued)

FOREIGN PATENT DOCUMENTS

| GB | WO/2005098362 A1 | 10/2005 |
| WO | WO/2007041547 A1 | 4/2007 |

OTHER PUBLICATIONS

Office Action dated Sep. 24, 2009, U.S. Appl. No. 11/785,284, filed Apr. 17, 2013.

(Continued)

*Primary Examiner* — Kim T Nguyen
(74) *Attorney, Agent, or Firm* — Clayton R. Morlock (57) ABSTRACT

A system and method for adapting the routing information provided by a mapping or routing device. In accordance with an embodiment, the system comprises a data collection component (e.g., one or more GPS, accelerometer, or other means of determining location and/or movement), and a route calculation logic that can use information about a first geographical location (origin), and a second geographical location (destination), to calculate a routing information, such as driving directions that a user can follow to drive from the origin to the destination. An information filtering application adapts the amount of information that will be presented to the user at a particular location, moment in time, or based on other criteria. In accordance with an embodiment, the information filtering application can, in some instances, be provided as a third-party application.

19 Claims, 5 Drawing Sheets

(56) References Cited

U.S. PATENT DOCUMENTS

| | | |
|---|---|---|
| 6,944,539 B2 | 9/2005 | Yamada et al. |
| 7,463,972 B2 | 12/2008 | Yamada et al. |
| 7,487,038 B2 | 2/2009 | Kitagawa et al. |
| 7,487,039 B2 | 2/2009 | Rumbo et al. |
| 7,508,321 B2 | 3/2009 | Gueziec et al. |
| 7,532,899 B2 | 5/2009 | Wilson et al. |
| 7,831,381 B2 | 11/2010 | Thota |
| 7,933,897 B2 | 4/2011 | Jones et al. |
| 7,957,871 B1 | 6/2011 | Echeruo |
| 8,688,367 B2 | 4/2014 | Mauderer |
| 2002/0022923 A1 | 2/2002 | Hirabayashi et al. |
| 2004/0167706 A1 | 8/2004 | Becker |
| 2004/0192311 A1 | 9/2004 | Koskinen et al. |
| 2004/0205394 A1 | 10/2004 | Plutowski |
| 2004/0254723 A1 | 12/2004 | Tu |
| 2005/0065779 A1 | 3/2005 | Odinak |
| 2005/0227676 A1 | 10/2005 | De Vries |
| 2006/0069503 A1 | 3/2006 | Suomela et al. |
| 2006/0157621 A1 | 7/2006 | Santos Rubio et al. |
| 2007/0016368 A1 | 1/2007 | Chapin |
| 2007/0078596 A1 | 4/2007 | Grace |
| 2007/0078598 A1 | 4/2007 | Watanabe et al. |
| 2007/0106469 A1 | 5/2007 | Ishizaki |
| 2007/0115142 A1 | 5/2007 | Nakashima |
| 2007/0143345 A1 | 6/2007 | Jones et al. |
| 2007/0299607 A1 | 12/2007 | Cubillo |
| 2008/0109718 A1 | 5/2008 | Narayanaswami |
| 2008/0125967 A1 | 5/2008 | Sprigg |
| 2008/0140310 A1 | 6/2008 | Graef |
| 2008/0147319 A1 | 6/2008 | Cubillo |
| 2008/0195312 A1 | 8/2008 | Aaron |
| 2008/0262714 A1 | 10/2008 | Ettinger |
| 2008/0262717 A1 | 10/2008 | Ettinger |
| 2008/0319652 A1 | 12/2008 | Moshfeghi |
| 2008/0319658 A1 | 12/2008 | Horvitz et al. |
| 2008/0319659 A1 | 12/2008 | Horvitz et al. |
| 2008/0319660 A1 | 12/2008 | Horvitz et al. |
| 2009/0005981 A1 | 1/2009 | Forstall et al. |
| 2009/0222201 A1* | 9/2009 | Jung ............................ 701/207 |
| 2010/0094536 A1 | 4/2010 | Lee et al. |
| 2012/0197690 A1* | 8/2012 | Agulnek ...................... 705/14.1 |
| 2014/0358425 A1* | 12/2014 | Seth et al. .................... 701/438 |

OTHER PUBLICATIONS

Office Action dated Jun. 28, 2010, U.S. Appl. No. 11/785,284, filed Apr. 17, 2013.

Office Action dated Oct. 14, 2010, U.S. Appl. No. 11/785,284, filed Apr. 17, 2013.

Office Action dated Apr. 28, 2011, U.S. Appl. No. 11/785,284, filed Apr. 17, 2013.

Office Action dated Jan. 30, 2014, U.S. Appl. No. 11/785,284, filed Apr. 17, 2013.

Office Action dated Aug. 19, 2010, U.S. Appl. No. 11/785,294, filed Apr. 17, 2013.

Office Action dated Mar. 7, 2011, U.S. Appl. No. 11/785,294, filed Apr. 17, 2013.

Office Action dated Jun. 21, 2011, U.S. Appl. No. 11/785,294, filed Apr. 17, 2013.

Office Action dated 2013-20-26, U.S. Appl. No. 11/785,294, filed Apr. 17, 2013.

Office Action dated Dec. 19, 2013, U.S. Appl. No. 11/785,294, filed Apr. 17, 2013.

Caduff, David et al, 2002, "The Landmark Spider: Respresenting Landmark Knowledge for Wayfinding Tasks" in the Journal of the American Association for Artificial Inelligence.

Ruetschi, Urs-Jakob, etal, "Routing by Landmarks", a Conference paper in the Swiss Transport Research Conference Proceedings, Mar. 15-17, 2006.

Non-Final Office Action for U.S. Appl. No. 11/785,284 dated Jan. 16, 2015.

Caduff-etal; The Landmark Spider: Respresenting Landmark Knowldege for Wayfinding Tasks, Aug. 21, 2007.

Ruetschi, Urs-Jakob et al., "Routing by Landmarks", 6th Swiss Transport Research Conference, Monte Verita / Ascona, Mar. 15-17, 2006.

* cited by examiner

SYSTEM AND METHOD FOR ADAPTING THE ROUTING INFORMATION PROVIDED BY A MAPPING OR ROUTING DEVICE

CLAIM OF PRIORITY

This application claims the benefit of priority to U.S. Provisional Patent Application titled "SYSTEM AND METHOD FOR ADAPTING THE ROUTING INFORMATION PROVIDED BY A MAPPING OR ROUTING DEVICE", Application No. 61/716,321, filed Oct. 19, 2012; which application is herein incorporated by reference.

CROSS-REFERENCE TO RELATED APPLICATIONS

This application is related to U.S. Patent Application titled "DEVICE, SYSTEM AND METHOD OF CONTACT-BASED ROUTING AND GUIDANCE", application Ser. No. 11/785,284, filed Apr. 17, 2007; and U.S. Patent Application titled "DEVICE, SYSTEM AND METHOD OF LANDMARK-BASED ROUTING AND GUIDANCE", application Ser. No. 11/785,294, filed Apr. 17, 2007, each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems for mapping and route guidance, and are particularly related to a system and method for adapting the routing information provided by a mapping or routing device.

BACKGROUND

A typical mapping or routing device (e.g., an in-car global positioning system (GPS), or a handheld smartphone device that includes a mapping software) can be used to display a map of a geographical area selected by a user, and provide routing information, such as driving directions that the user can follow to drive from a first geographical location (origin), to a second geographical location (destination).

In some instances, the routing information can include a graphical component (e.g., a graphical representation of a suggested driving route displayed in combination with a graphical map), coupled with a textual or audio component (e.g., directions to the user on how to drive in order to reach the destination, such as "Drive north on Broadway for a distance of one mile", "Turn right at the corner of 37th Street", or the like).

However, a problem with current mapping or routing devices is that they generally operate independently of a user's/driver's familiarity with a particular geographical area, and as such are not designed to adapt accordingly. This is the general area that embodiments of the invention are designed to address.

SUMMARY

Described herein is a system and method for adapting the routing information provided by a mapping or routing device. In accordance with an embodiment, the system comprises a data collection component (e.g., one or more GPS, accelerometer, or other means of determining location and/or movement), and a route calculation logic that can use information about a first geographical location (origin), and a second geographical location (destination), to calculate a routing information, such as driving directions that a user can follow to drive from the origin to the destination. An information filtering application adapts the amount of information that will be presented to the user at a particular location, moment in time, or based on other criteria. In accordance with an embodiment, the information filtering application can, in some instances, be provided as a third-party application; for example, in the case of a mapping/routing device incorporated into a smartphone device that includes a mapping software, the information filtering application can be provided as a downloadable or otherwise installable third-party software application that can be installed into the smartphone device and used to adapt the routing information the device provides to a user.

DETAILED DESCRIPTION

As described above, a typical mapping or routing device (e.g., an in-car global positioning system (GPS), or a handheld smartphone device that includes a mapping software) can be used to display a map of a geographical area selected by a user, and provide routing information, such as driving directions that the user can follow to drive from a first geographical location (origin), to a second geographical location (destination). However, a problem with current mapping or routing devices is that they generally operate independently of a user's/driver's familiarity with a particular geographical area, and as such are not designed to adapt accordingly.

Embodiments of the invention are generally related to systems for mapping and route guidance, and are particularly related to a system and method for adapting the routing information provided by a mapping or routing device. In accordance with an embodiment, the system comprises a data collection component (e.g., one or more GPS, accelerometer, or other means of determining location and/or movement), and a route calculation logic that can use information about the origin and the destination, to calculate a routing information, such as driving directions that a user can follow to drive from the origin to the destination.

In accordance with an embodiment, an information filtering application, which in some instances can be provided as a third-party application, can, based on a user-specified setting, determine the type or how much routing information the system should provide to the user. For example, a "volume" or "slider" type control, or an "expert" software setting, or other means, can be provided to allow the user to instruct the system to provide more or less routing information in appropriate circumstances. Such settings can be manually or directly modified by the user, or can be automatically determined by an external application based on various criteria.

By way of illustration, the settings can be used to instruct the system that routing information be turned off, with no routing information provided; or alternatively that routing information be turned on, with a reduced level of routing information provided; or alternatively that routing information be turned on, with a full level of routing information provided; or another level of adapted map/routing information. Adjusting the level of routing information is akin to adjusting the volume of detail provided to the user, from no detail to all available detail. A special case of the above is for the system to completely turn off the providing of routing information, say for a particular portion of a route, and then to turn on all routing information for another portion of the route.

In accordance with an embodiment, the user-specified settings can specify that the routing information remain at a particular level, e.g., for a particular environment or user. Alternatively, the settings can specify that the routing information should vary for the particular environment or user according to, e.g., the user's current location/address when compared to the destination, or the user's lat/long position, or a time value such as when the user is within, e.g., 10 minutes from their destination; or when the user has traveled a particular percentage, e.g., 80% along a particular routing path toward the destination.

When, according to the settings and the determination of the above criteria, the system determines that a reduced level of routing information should be provided, say because the user is familiar with the general location, and is far away from their destination, then, in accordance with an embodiment, the system can provide a reduced level of routing information, or in the special case described above, routing information can be turned off completely for a time period.

Subsequently, when, according to the settings and a determination of the above criteria, the system determines that an increased level of routing information should be provided, say because the user is nearing their destination, then, in accordance with an embodiment, the system can provide a correspondingly increased, or full level of routing information.

Although the above embodiments generally describe that the user/vehicle's current location, time and/or other criteria is used by the route calculation logic to provide an adapted map/routing information, in accordance with various embodiments the route calculation logic can alternatively or additionally use personal contacts information and/or landmark information, such as that described respectively in U.S. Patent Application titled "DEVICE, SYSTEM AND METHOD OF CONTACT-BASED ROUTING AND GUIDANCE", application Ser. No. 11/785,284, filed Apr. 17, 2007; and U.S. Patent Application titled "DEVICE, SYSTEM AND METHOD OF LANDMARK-BASED ROUTING AND GUIDANCE", application Ser. No. 11/785,294, filed Apr. 17, 2007, herein incorporated by reference.

Figure 1:
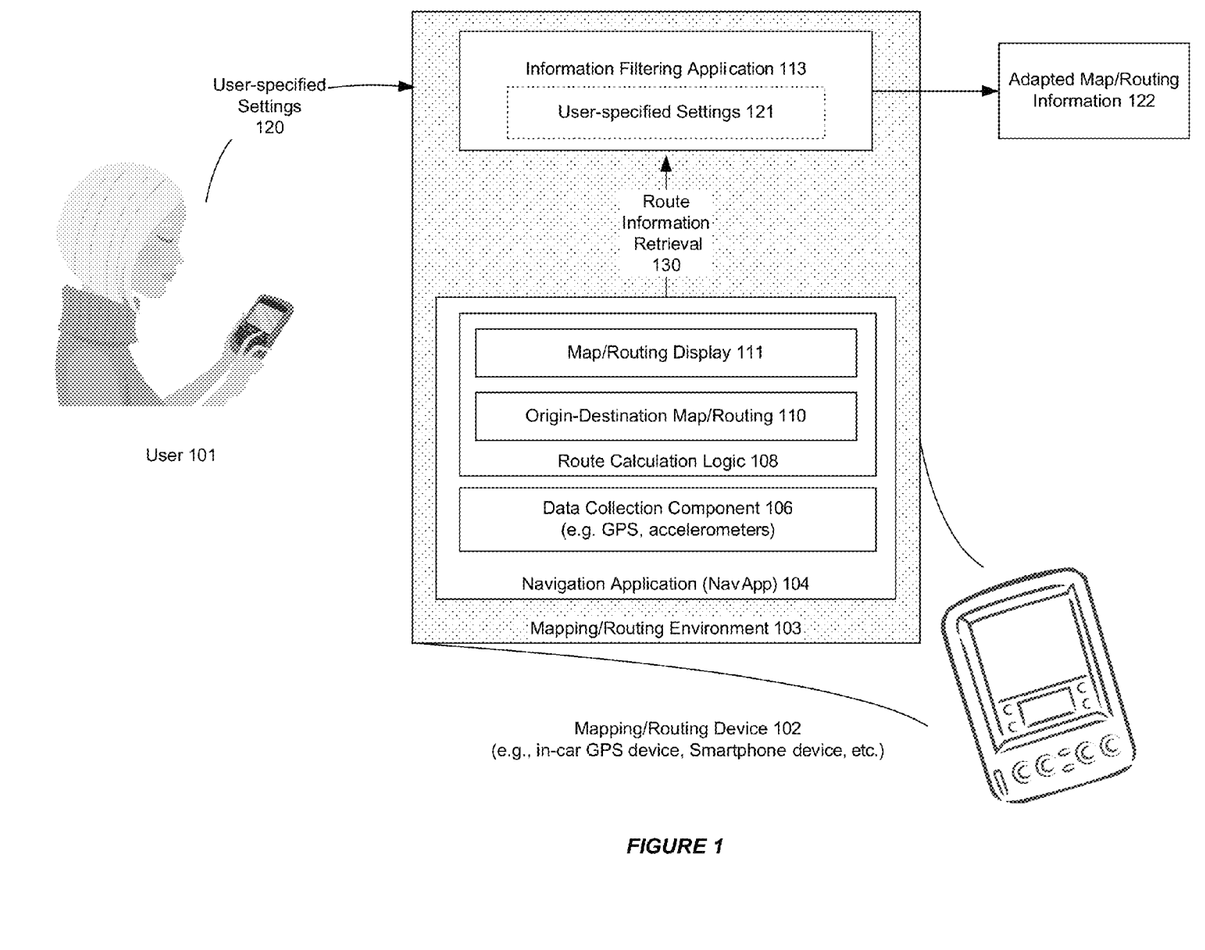
FIG. 1 illustrates a system for adapting the routing information provided by a mapping or routing device, in accordance with an embodiment.

FIG. 1 illustrates a system for adapting the routing information provided by a mapping or routing device, in accordance with an embodiment. As shown in FIG. 1, a mapping/routing device 102 can be provided as, e.g., an in-car GPS device, a suitably-equipped smartphone device, or another type of mapping/routing device.

In accordance with an embodiment, the mapping/routing device provides a mapping/routing environment 103, which includes a navigation application (navapp) 104 having a data collection component 106 (e.g., one or more GPS, accelerometers, or other means of determining the location and movement of the user), together with a route calculation logic 108 that can use information about a first geographical location (origin), and a second geographical location (destination), in combination with the data collection component, to calculate a routing information, such as driving directions that the user can follow to drive from the origin to the destination. The route calculation logic can include an origin-destination map routing component 110 that calculates a routing information, such as a map/routing display 111, from the origin to the destination.

In accordance with an embodiment, an information filtering application 113 can be provided to adapt the amount of information that will be presented by the system to the user, including an adapted map/routing display. In accordance with an embodiment, the information filtering application can be provided as a third-party application. For example, in the case of a mapping/routing device incorporated into a smartphone device that includes a mapping software, the information filtering application can be provided as a downloadable or otherwise installable third-party software application that can be installed into the smartphone device and used to adapt the routing information the device provides to a user.

In accordance with an embodiment, a user 101 can specify a setting 120 (such as the use of a "volume" or "slider" type control, or an "expert" software setting), which is used by the information filtering application, to configure 121 and thereafter adapt the amount of map/routing information originally provided 130 by the navapp, and present it instead as adapted map/routing information 122 to the user at a particular location, moment in time, or based on other criteria as described in further detail below.

In accordance with an embodiment, the information filtering application (e.g., third-party application) thereafter adapts the level of routing information provided by the navapp, e.g., by giving the appearance that the navapp has "gone to sleep" and is then woken up at a particular location, as specified by the configuration as, e.g., a latlong, street address, distance from destination, time from destination, or other criteria.

Figure 2:
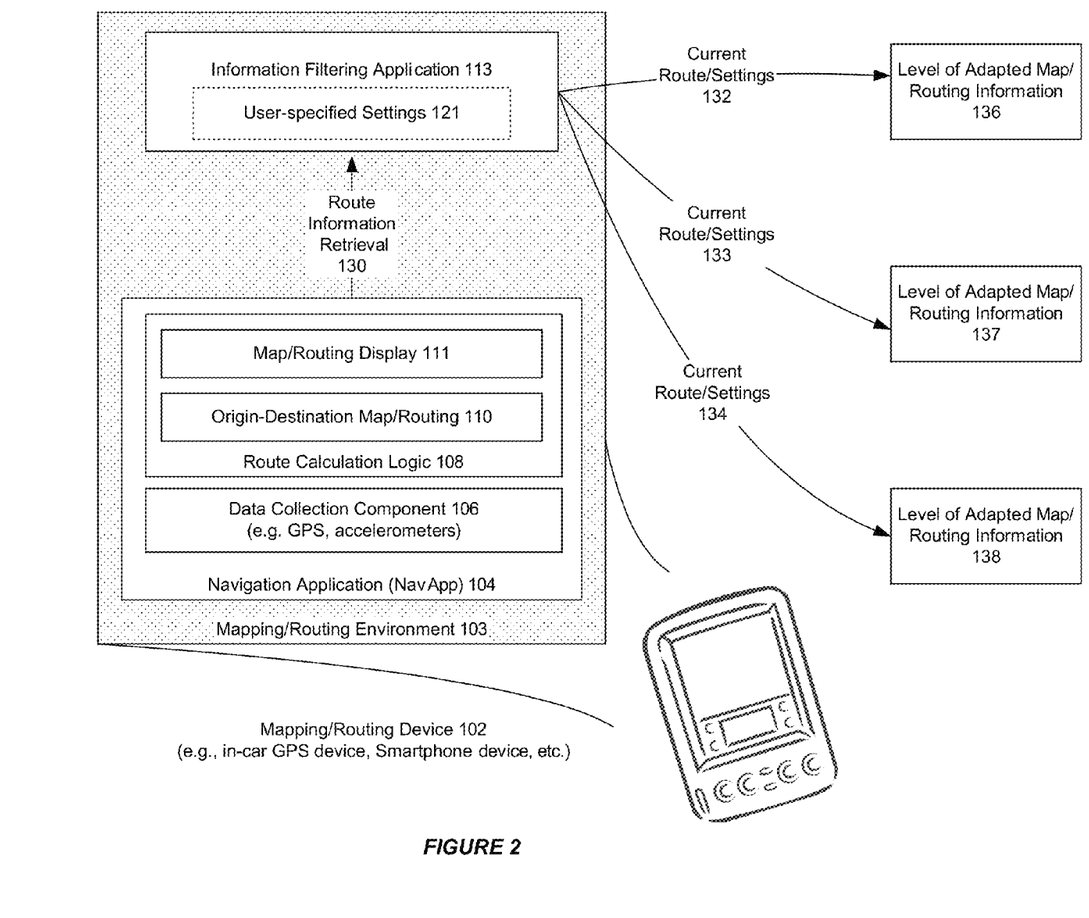
FIG. 2 further illustrates a system for adapting the routing information provided by a mapping or routing device, in accordance with an embodiment.

FIG. 2 further illustrates a system for adapting the routing information provided by a mapping or routing device, in accordance with an embodiment. As shown in FIG. 2, the information filtering application can adapt the amount of map/routing information originally provided by the navapp, and present it instead as different levels of adapted map/routing information 136, 137, 138, to the user at different, e.g., locations or moments in time 132, 133, 134. In accordance with an embodiment, exceptions can be made for unusual circumstances, e.g., in the event of an unusual traffic situation the level of adapted map/routing information may be temporarily increased.

Figure 3:
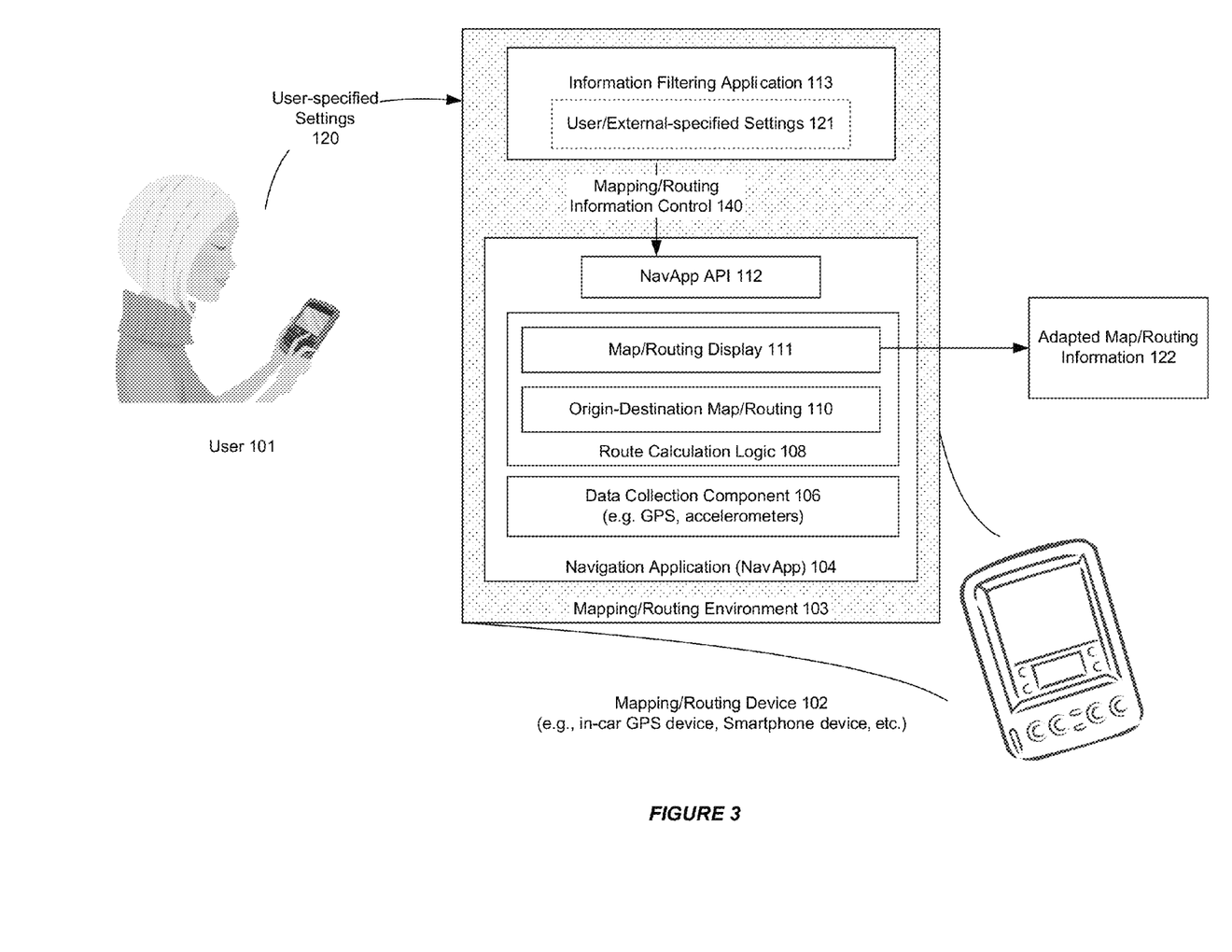
FIG. 3 illustrates a system for adapting the routing information provided by a mapping or routing device, in accordance with another embodiment.

FIG. 3 illustrates a system for adapting the routing information provided by a mapping or routing device, in accordance with another embodiment. As shown in FIG. 3, in accordance with an embodiment, the navapp can include a navapp API that enables access by third-party applications to the navapp. In such embodiments, in addition to the information filtering application operating as above to adapt the amount of map/routing information originally provided by the navapp, the information filtering application can intercept, read, or otherwise access map/routing information 140, and thereafter adapt the amount of information that will be presented by the system to a user.

Figure 4:
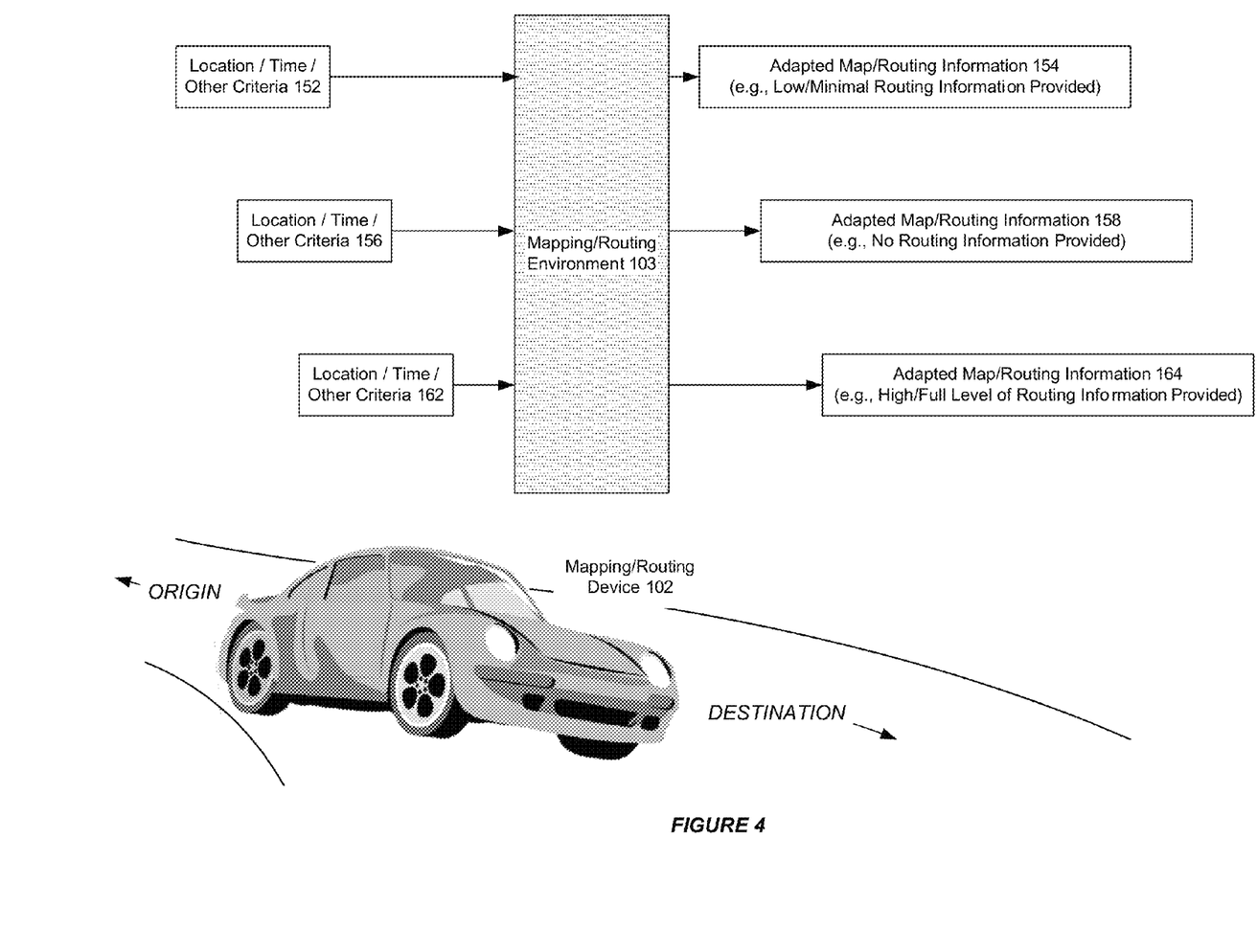
FIG. 4 illustrates the use of a system for adapting the routing information provided by a mapping or routing device, in accordance with an embodiment.

FIG. 4 illustrates the use of a system for adapting the routing information provided by a mapping or routing device, in accordance with an embodiment. As shown in FIG. 4, in accordance with an embodiment, the mapping/routing device can be provided, e.g., as an in-car GPS device for use by a driver in obtaining driving directions from an origin location to a destination location. At a particular location or moment in time 152, or based on other criteria as determined by the information filtering application configuration, the mapping/routing device can provide a particular level of adapted map/routing information 154, such as routing information turned off, with no routing information.

At a subsequent location or moment in time 156, or based on other criteria as determined by the information filtering application configuration, the mapping/routing device can provide a different level of adapted map/routing information 158, such as routing information turned on, with reduced level of routing information.

At a yet subsequent location or moment in time 162, or based on other criteria as determined by the information filtering application configuration, the mapping/routing device can provide a yet different level of adapted map/routing information 164, such as routing information turned on, with full level of routing information, or another level of adapted map/routing information.

Figure 5:
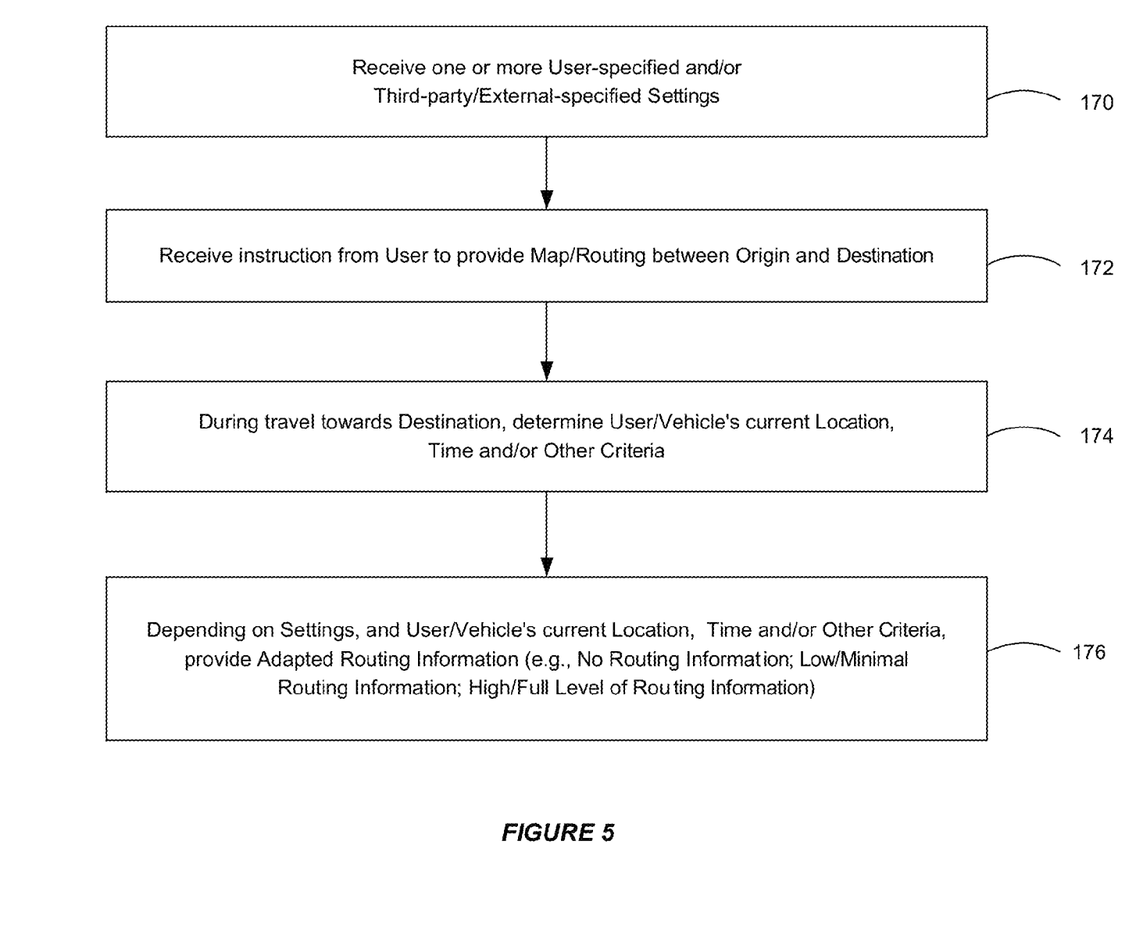
FIG. 5 illustrates a method of adapting the routing information provided by a mapping or routing device, in accordance with an embodiment.

FIG. 5 illustrates a method of adapting the routing information provided by a mapping or routing device, in accordance with an embodiment. As shown in FIG. 5, at step 170, the system receives one or more user-specified and/or third-party and/or external-specified configuration.

At step 172, the system receives an instruction from a user to provide map/routing between a first geographical location (origin), and a second geographical location (destination).

At step 174, during travel towards destination, the system determines the user/vehicle's current location, time and/or other criteria.

At step 176, depending on the configuration, and the user/vehicle's current location, time and/or other criteria, the system provides an adapted map/routing information (e.g., routing information turned off, with no routing information; routing information turned on, with reduced level of routing information; routing information turned on, with full level of routing information; or another level of adapted map/routing information).

The present invention may be conveniently implemented using one or more conventional general purpose or specialized digital computers or microprocessors programmed according to the teachings of the present disclosure, or a portable device (e.g., a smartphone, PDA, computer or other device). Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated.

What is claimed is:

1. A mapping and routing device, comprising:
   at least one computer processor;
   a graphical and textual display device;
   a user input device configured to receive user preferences for routing and routing information from at least one user prior to and during transit along a route;
   an audio output component configured to output audible routing information; and
   at least one computer memory configured to store:
      a route calculation logic;
      an information filtering application; and
      user preferences for routing and routing information from at least one user;
   wherein the route calculation logic and information filtering application are transmitted from the at least one computer memory and implemented on the at least one computer processor and wherein the calculation logic is configured to calculate at least one route and routing information from an origin to a destination; and
   wherein the information filtering application is configured to select specific routing information based on:
      the at least one user preferences stored in memory;
      user preferences for routing and routing information input received from the user input device during transit along the calculated at least one route; and
      external criteria; and
   to present the specific routing information on at least one of the display device and the audio output component.

2. The mapping and routing device of claim 1, wherein the presented specific routing information is at least in part a function of a location along the calculated route, and a time period during transit of the calculated route.

3. The mapping and routing device of claim 1, wherein the information filtering application is stored in a first computer memory and implemented on a first computer processor and the route calculation logic is stored in a second computer memory and implemented on a second computer processor.

4. The mapping and routing device of claim 1, wherein the mapping and routing device is a mobile device that includes a mapping software, and wherein the information filtering application is provided as a downloadable or otherwise installable external software application installed into the mobile device.

5. The mapping and routing device of claim 1 wherein the user preferences comprise a preference for one of: no routing information, more routing information or less routing information within a buffer between the origin and the destination.

6. The mapping and routing device of claim 1 wherein the user input device further comprises at least one of a volume and slider type control interface and an expert software setting configured to control an amount of routing information to be presented a user of the user input device.

7. The mapping and routing device of claim 1 further comprising a data collection component configured to determine a location of the mapping and routing device and to present the routing information in part based on location along the calculated route.

8. The mapping and routing device of claim 1 configured to further reduce the selected routing information presented to a user of the mapping and routing device when the mapping and routing device is within a threshold travel time to a location specified by the user.

9. The mapping and routing device of claim 1 further comprising a database of personal contact and personal landmark information wherein the user preferences comprises instructions to include a personal contact and personal landmark information from the database of personal contact and personal landmark information as part of the specific route information when the personal contact and personal landmark information is in a vicinity of the calculated route.

10. The mapping and routing device of claim 1 wherein the user preferences are overridden when high traffic situations are encountered along the calculated route.

11. The mapping and routing device of claim 1 wherein the general user preferences for routing and routing information for at least one user are a function of one or more of: the time the route is to be driven, one or more locations along the route, and environment factors in the vicinity of the route.

12. A method implemented on a mapping and routing device, comprising the steps of:
    providing a route calculation logic configured to calculate at least one route and routing information from an origin to a destination; and
    selecting, using an information filtering application during transit along the calculated at least one route, specific routing information for presentation to a user of the mapping and routing device based on:
    at least one of previously stored user inputted criteria;
    user input criteria received during transit along the calculated at least one route; and
    external criteria.

13. The method of claim 12, wherein the information selected for presentation to the user is at least in part a function of a location along the calculated route, and a time period during transit of the calculated route.

14. The method of claim 12, wherein the information filtering application is provided as an external application.

15. The method of claim 14, wherein the mapping and routing device is a mobile device that includes a mapping software, and wherein the information filtering application is provided as a downloadable or otherwise installable external software application that can be installed into the mobile device and used to adapt the routing information the device provides to the user.

16. The method of claim 12 further comprising selection of an amount of routing information for presentation using a user interface configured with at least one of a volume and slider type control interface and an expert software setting.

17. The method of claim 12 wherein the mapping and routing device further comprises a data collection component configured to determine a location of the mapping and routing device and to present routing information in part based on the location along the calculated route.

18. The method of claim 12 wherein the mapping and routing device further comprises a database of personal contact and personal landmark information wherein the user input criteria comprises instructions to include personal contact and person landmark information as part of the specific route information when the personal contact and personal landmark information is in a vicinity of the calculated route.

19. The method of claim 12 wherein the user input criteria used to select the specific routing information is overridden when high traffic situations are encountered along the calculated route.

* * * * *